(12) United States Patent
Schöning et al.

(10) Patent No.: US 11,312,395 B2
(45) Date of Patent: Apr. 26, 2022

(54) DETERMINATION OF AUTHORIZATIONS WHEN APPROACHING LOCATIONS WITH AN AUTONOMOUS VEHICLE

(71) Applicant: Volkswagen Aktiengesellschaft, Wolfsburg (DE)

(72) Inventors: Volkmar Schöning, Wedemark (DE); Frank Hüsemann, Cremlingen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 29 days.

(21) Appl. No.: 17/025,088

(22) Filed: Sep. 18, 2020

(65) Prior Publication Data

US 2021/0086794 A1 Mar. 25, 2021

(30) Foreign Application Priority Data

Sep. 19, 2019 (EP) ..................................... 19198492

(51) Int. Cl.
*B60W 60/00* (2020.01)

(52) U.S. Cl.
CPC .. *B60W 60/0027* (2020.02); *B60W 60/00256* (2020.02); *B60W 2540/041* (2020.02); *B60W 2556/50* (2020.02)

(58) Field of Classification Search
CPC ....... B60W 60/0027; B60W 60/00256; B60W 2556/50; B60W 2540/041
See application file for complete search history.

(56) References Cited

U.S. PATENT DOCUMENTS

| 9,688,288 | B1 | 6/2017 | Lathrop et al. |
| 10,657,288 | B2 * | 5/2020 | Sellschopp ............ G06F 21/629 |
| 2017/0038773 | A1 * | 2/2017 | Gordon ................ G05D 1/0061 |
| 2017/0080900 | A1 | 3/2017 | Huennekens et al. .......... 701/25 |
| 2017/0147959 | A1 * | 5/2017 | Sweeney ........ G06Q 10/063114 |
| 2018/0196421 | A1 * | 6/2018 | Carlhoff ................ G05D 1/0022 |
| 2019/0375409 | A1 * | 12/2019 | Hunt .................. B60W 30/182 |
| 2020/0062265 | A1 | 2/2020 | Wunderlich |

FOREIGN PATENT DOCUMENTS

| DE | 102016116910 A1 | 3/2017 | ............ B60W 30/00 |
| DE | 102017202834 A1 | 8/2018 | ............ B60W 50/08 |

OTHER PUBLICATIONS

European Search Report, Application No. 19198492.1, 10 pages, dated Mar. 26, 2020.

* cited by examiner

*Primary Examiner* — Russell Frejd
*Assistant Examiner* — Brittany Renee Peko
(74) *Attorney, Agent, or Firm* — Slayden Grubert Beard PLLC

(57) ABSTRACT

A method for operating an autonomously operable motor vehicle comprising: receiving location data relating to a planned location of a motor vehicle; determining whether the motor vehicle is authorized to approach the planned location according to the location data by using at least one of the following: a) personal data about at least one person using the motor vehicle; b) a number of persons using the motor vehicle; c) load data about a load that is being or is to be transported by the motor vehicle.

15 Claims, 1 Drawing Sheet

DETERMINATION OF AUTHORIZATIONS WHEN APPROACHING LOCATIONS WITH AN AUTONOMOUS VEHICLE

CROSS-REFERENCE TO RELATED APPLICATIONS

This application claims priority to European Patent Application No. EP 19198492.1, filed on Sep. 19, 2019 with the European Patent Office. The contents of the aforesaid Patent Application are incorporated herein for all purposes.

TECHNICAL FIELD

The invention relates to a method and a control unit for operating an autonomously operable motor-vehicle. Autonomously operable motor vehicles can also be termed autonomous or self-driving motor vehicles. In a manner known per se, they can drive independently without a driver, or respectively without continual or ongoing driver interventions. In particular, the motor vehicle can be a passenger car or a truck.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Geographic zones or locations for autonomous vehicles can be defined within which they can only be operated using predetermined operating modes.

Such a definition of predetermined zones or locations has not always proven to be practical. For example, only relatively blanket instructions are possible as to which locations can be approached autonomously without being able to make additional differentiations.

SUMMARY

An object exists to improve the operation of autonomous motor vehicles, for example with respect to enabling a location-dependent autonomous driving mode.

The object is solved by a method and by an arrangement having the features of the independent claims. Embodiments are presented in the dependent claims and the following description.

DETAILED DESCRIPTION

Figure 2:
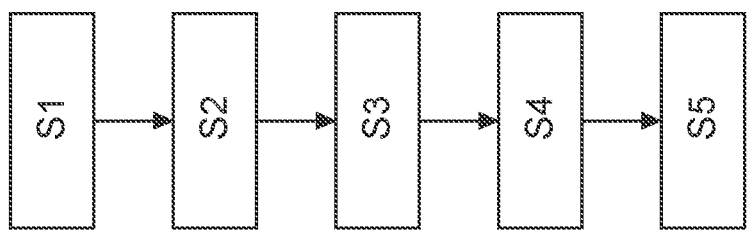
FIG. 2 shows a flow chart of the method according to the exemplary method.

Generally and in some embodiments, it is proposed to take into account other and for example personal criteria of users of a motor vehicle in addition to location-dependent criteria that establish whether the autonomous motor vehicle may or may not approach a certain location. Consequently, there is an additional differentiation option, and the flexibility of motor vehicle operation is increased. For example, it may then be specified that certain locations may only be approached by certain persons, but other locations may only be approached by other persons. Depending on the location that is to be approached, it may be determined for a specific person whether or not a person is authorized to do this. This makes it possible for example to define person-dependent access-restricted locations, or geographic regions composed therefrom, for example in order to improve local safety. In some embodiments, it is possible to enable security forces to approach these regions, or respectively locations for example in emergency situations since they may be defined as authorized persons.

In some embodiments, it is also possible to separately grant access authorizations in individual cases, for example to enable a motor vehicle and/or suppliers to deliver goods to a certain location without however this location having to be approved for approach by the general public. The access authorizations in this case may be granted depending on the specific goods or load.

In a first exemplary aspect, a method is proposed for operating an autonomously operable motor vehicle (such as an autonomously driving passenger car) comprising:
- receiving location data relating to a planned location of the motor vehicle;
- determining whether the motor vehicle is authorized to approach the planned location according to the location data by using at least one of the following:
  a) personal data about at least one person using the motor vehicle;
  b) a number of persons using the motor vehicle;
  c) load data (or load-related data) about a load that is being transported by the motor vehicle.

The execution of the method may in general and in some embodiments be implemented by a computer, such as by means of the control unit described herein. Correspondingly, all the method measures by themselves or in any combination may be executed automatically and/or implemented by a computer. For example, the preceding determination may be a process executed by an algorithm and/or program instructions.

The motor vehicle may for example be authorized when a person using the motor vehicle or the load transported thereby is authorized to approach the location.

In the determination according to b), it may for example be determined if the number is at least one i.e., whether a person is in fact sitting in the vehicle. Such a determination may for example be accomplished by seat sensors, by interior cameras, by determining the presence of a personal terminal (such as a smart phone), or the like. Indirect determination from an opening and closing of doors is also possible.

If the number does not correspond to a predetermined minimum value and for example does not at least correspond to one (i.e., no person is the vehicle), it may be concluded that the vehicle has an undesired number of persons and for example is unoccupied. It may then be prevented that the motor vehicle is for example driven to the planned location unoccupied. This prevents the vehicle from being driven toward the location unintentionally or by being manipulated.

In the case of the determination according to b), it may be provided that all approachable locations for the vehicle may only be approached when the number of persons using the vehicle is at least one.

With the determination according to c), an identity, type and class of a load may be determined. It may then be checked whether this load (or respectively this type or class of load) is authorized to be transported to the end location. Correspondingly, location-dependent authorization data may exist or be specifiable that define which load (i.e., which specific load with a certain identity, which types of load, and/or which classes of load) may be transported to this location. It may be checked whether or not the motor vehicle with a corresponding load is authorized to approach the planned location.

The load data may for example be determined and/or specified by a manual entry, for example if the load data relates to the identity of the load. In addition or alternatively, the load data for example be determined by image evaluation algorithms that for example evaluate images of the load recorded by the vehicle cameras (for example in order to establish the size or shape). In addition or alternatively, weight sensors for example in the loading area of the motor vehicle may provide load data. By means of image evaluation and/or weight sensors, the load data may for example classify the load (for example according to weight or size), or assign it to a type of load (such as bulk material, packages or liquid containers).

The method in some embodiments may furthermore comprise the following measure:
when a person and/or a motor vehicle is unauthorized to approach the location: prevent an approach to the planned location, for example by automatically rerouting the motor vehicle, and/or automatically stopping the motor vehicle, and/or automatically outputting warning signals and/or alternative route proposals for the motor vehicle.

Obtaining personal data, and/or the location data and/or generally the data according to a)-c) may include automatically requesting, or in other words demanding this data. Alternatively or in addition, this data may be determined automatically, or respectively apart from the driver.

For example, at least one person determining unit may be provided that is configured to determine the personal data according to a). This may be a control unit of the vehicle and/or a function provided by the control unit disclosed herein. The personal data may be determined generally or by means of such a unit, for example by determining an identifying entry by a person into an input unit in the motor vehicle (such as a touch screen) or into a device outside of the vehicle (such as a terminal like a smart phone). It is also possible for a person to carry RFID tags and determine personal data encoded thereby. Moreover, personal data may for example be determined by cameras or other vehicle sensors installed in the interior of the motor vehicle. The data may then for example refer to the recognition of professional clothing or other predetermined visual features of the person.

To determine the location data which may also be provided according to the present aspect as a separate measure, the planned location of the motor vehicle may be determined by means of a navigation system of the motor vehicle. This may generally be configured to perform route planning for the motor vehicle, for example automatic route planning, for example according to a desired destination.

In general, the planned location may be a future planned location. This may for example lie along a determined, specified or generally planned route of the motor vehicle. For example it is a target location of the motor vehicle, or a location that lies near the target location and for example is less than one kilometer distant therefrom.

In some embodiments, "approaching a planned location" may be understood to mean that the motor vehicle focuses on this location as a target location and for example at least temporarily stops there. For example, the person may be allowed to get out at this planned location to be approached, and/or other people may be allowed to get in (for example by deactivating an automatic vehicle lock).

According to some embodiments, the determination of whether the person is authorized to approach the planned location (i.e., the determination of authorization) is carried out on the basis of location-dependent authorization data that define the persons authorized to approach the location. In the case of b), the authorization data is a number of persons required, or respectively permitted for authorization. In the case of c), the authorized types, classes or specific loads may be defined depending on the location.

For example, which persons, numbers or loads are authorized to approach a location may be saved in a database, or may for example be determined based on a query and/or by means of algorithms. Such a determination may be performed by a control unit disclosed herein. Alternatively, the control unit may transmit the location data that for example is received from a navigation system of the motor vehicle to a vehicle-external computer unit (such as a server and for example a cloud server). This may then determine, read out or specify which persons, numbers or loads are authorized to approach and for example stop at this location. This authorization data may then be transmitted back to the control unit.

Alternatively or in addition and in some embodiments, the vehicle-external computer apparatus, or another, for example also external computer apparatus, may directly determine whether a person using the motor vehicle corresponds to a person authorized according to authorization data.

By means of this version, it is possible to define with little effort and in a user-friendly manner which locations may be approached by which persons, numbers or loads. For example, the authorization data can, according to a predetermined classification, define classes of persons or loads that are authorized to approach certain locations.

In addition or alternatively and in some embodiments, it is also possible to specify personal authorization data, or respectively to determine the authorization based on such personal authorization data. This personal authorization data may define those locations that may be approached by a specific person (or a class of persons as well). In this manner, e.g., class-specific locations and/or regions with several locations may then be defined that may be approached by certain persons, for example, all locations approachable by security forces, or all locations approachable by the general public. The above versions may also be provided for loads.

Determining authorizations may correspondingly include determining the associated person-dependent or load-dependent authorization data using the personal or load-related data, and then it is furthermore determined whether the current location to be approached corresponds to one of the locations that are defined, or respectively authorized by this authorization data.

Some embodiments provide that the (at least one piece of) personal data classifies the person according to a predetermined classification. In addition or alternatively and in some embodiments, the personal data may also comprise or be the identity (for example the name) or comparable data that very clearly specifies the identity. Providing a classification makes it possible to define classes, and/or types, and or groups of persons who for example are or are not collectively authorized to approach certain locations. This makes it possible to assign approachable locations easily, flexibly and in a user-friendly manner to persons who are authorized to approach (see also the above examples with respect to security forces and the general public).

For example in this context, it may be provided for the classification to be an occupational classification. Employees of companies, organizations or agencies are possible relevant occupations, for example when the location is to be assigned to a certain company, agency or organization. Furthermore, security-relevant occupations are possible such as emergency responders, firemen, police or military forces, for example when the locations are not accessible to the general public (at least in motor vehicles).

In addition, a classification may be according to predetermined authorization classes. Then persons may be categorized into predetermined authorization classes, and/or locations may be assigned corresponding authorization classes in order to establish which persons are authorized to approach this location. The authorization classes may for example be defined with respect to security-relevant criteria, for example so that depending on the security requirements only classes with a correspondingly high security classification are authorized to approach.

Furthermore, the classification may also be a whereabouts-related classification. A whereabouts may be understood to be a permanent residence, or only temporary whereabouts as well (such as temporary whereabouts in hotels, offices, the workplace or the like). Generally, a geographic classification may also be possible that however refers to a geographic feature (such as an expected whereabouts) of an associated person or a load as well. In this manner, for example only local residents may be granted autonomous entry into a predetermined region, or respectively to predetermined locations.

In other words, permissible whereabouts may be specified for persons or loads (such as a residence, commercial area, factory site or workplace). It may then be determined whether a person is classified as living or working at the planned location, or whether a load is classified as being requested, needed, or permitted at the planned location, and then an authorization may be established.

In general, it may be provided that the personal data is variable, for example while the motor vehicle is being used by the person. In this manner, it may for example be taken into account that a person is no longer on duty while the motor vehicle is being used, or respectively may exceed a period of service. Expressed otherwise, the person may lose their occupational classification or function while using the motor vehicle, for example upon reaching an end of a work period. Correspondingly, the person may then no longer be authorized to approach certain locations. Correspondingly, the personal data may change from for example occupational data to data that defines the person as belonging to the general population.

According to some embodiments, an authorization may be granted by means of a vehicle-external unit (or respectively is granted as a special method measure), for example by means of a terminal that is monitored, or in other words operated or controlled by another person. The terminal may for example be a smart phone or a computer. The authorization may for example exist in the form of location-dependent, load-dependent or person-dependent authorization data of the above-explained type, or respectively be defined or granted as such.

For example, it may be provided that the authorization is granted or grantable in response to an authorization request. For example when a certain location is to be approached, first another person and/or computer unit assigned to this location is contacted in order to obtain therefrom a possible authorization to approach this location. Such an authorization request may be initiated automatically. For example, a location may be ascribed the necessity of a corresponding authorization request, for example by means of a corresponding user setting or definition. If this location is then approached, an authorization request of the above-explained type may automatically be initiated. An element of the authorization request may also be naming, identifying or classifying the person using the motor vehicle or the loaded load with personal or load-related data in the authorization request.

Based on this, the vehicle-external user or vehicle-external computer unit may then decide whether to grant authorization.

The preset embodiments are for example relevant for transporting goods if the person using the motor vehicle wants to drive for example to the whereabouts of another person to deliver an order. For example if this location is a location inaccessible to the general public, through a corresponding authorization request and/or granting of authorization to especially this motor vehicle, or respectively this supplier, it may still be made possible to nonetheless be able to approach this location as needed, so to speak. The authorization may also be granted in consideration of a transported load.

According to some embodiments, when an authorization is not present or, expressed otherwise, it is determined that the person or motor vehicle is not authorized to approach the planned location according to the location data, alternatively approachable locations are determined. These may be locations along alternative proposed routes, for example however an alternative target location. The determination may be performed automatically, for example taking into account that the originally planned location is no longer approachable. To accomplish this, functions of a navigation system of the motor vehicle may be used (for example route planning functions). The alternative locations, or respectively routes may be proposed to a person for example for final selection and/or approval. This may be done using a display unit of the vehicle, or however a terminal (such as a smartphone) of the person.

As mentioned, "approaching a location" may for example be understood to mean approaching a target location at which getting out, getting in, loading or unloading or parking the motor vehicle is then made possible. According to some embodiments, when a person or the motor vehicle is in contrast not authorized to approach the location (for example when it results in the above-explained determination), it is at least made possible to pass through or in other words drive through the location. For example in this case, permanently stopping and for example parking, loading or unloading and getting out or getting in the motor vehicle may be prevented. For example, a door lock may remain closed and/or a driving speed greater than 0 km/h may be maintained, to the extent permitted by the traffic situation. Expressed otherwise, transit authorizations or a transit right may be granted so that for example a security-relevant region may at least be traversed. In this case, it may also be provided that opening windows, a convertible top, flaps and/or a roof window is not allowed for example by maintaining a lock.

In general it should be noted that approaching a location may also be equated with traveling a route which then for example includes a corresponding planned location. It may therefore also be checked whether the person is entitled to travel a route, e.g. including a certain location. If this route or at least a section thereof (and/or the at least one location)

lies within a region with access restrictions, only traversing the region, or respectively traveling the route without permanently stopping or getting in/getting out may then be enabled depending on the authorization of the person.

Some embodiments provide that when there are many persons using the motor vehicle, the authorization is determined for each of the persons (i.e., the authorization as to whether each of the persons is authorized to approach the planned location). To accomplish this, personal data may be obtained for each of the persons, and a corresponding determination may then be carried out. This increases the safety or generally the reliability with respect to a desired approach of locations only by authorized persons.

The vehicle may also be configured to undertake route planning depending on the authorization of the persons or loads, and/or locations (and for example alternative locations) in a sequence depending on the authorization. For example, first locations could be approached for which all persons or loads are authorized, and only afterwards may locations be approached for which at least some of the persons or loads (that for example already got out or were unloaded at a previous location) would not be authorized. For example only at a later time, or respectively after approaching locations for example accessible to the general public may a security zone be entered. Alternatively, it may be provided that persons unauthorized to approach certain locations must select and/or indicate alternative locations.

In general it may be provided that criteria are variable which determine an authorization of persons or loads to approach a location. For example, these criteria may be redefined if needed. For example, it may be provided to adapt personal, load-related or location-related authorization data depending on changing conditions in the real world. For example for certain locations, temporarily elevated security requirements may apply, for example when public events, events of a political nature or general gatherings of people occur there. For these locations, the location-dependent authorization data may be changed, e.g. so that only persons or loads with a high security classification or a desired occupational function are authorized to approach these locations.

This may also result in it being found that vehicles with persons or loads are at a location with changing location-dependent authorization data, even though they are no longer authorized to stay at this location, and for example to approach this location according to the changed authorization data. An alternative route proposal may then be sent to these persons and/or vehicles, or for example a request to leave the location within a specific period.

According to some embodiments, it may also be provided that the determination of whether a motor vehicle is authorized to approach a planned location may also be made taking into account motor vehicle data. For example, it may be taken into account whether the personal and/or load-related data corresponds to motor vehicle data and/or appears plausible.

For example, it may be checked whether the personal and/or load-related data and the vehicle data indicate an equivalent occupational qualification or security classification. For example, it may be checked whether the motor vehicle is professional in nature or may be used professionally (for example is registered with an agency or generally with security forces or with a supplier). Furthermore, it may be checked whether the personal data would indicate an equivalent function and/or qualification, or whether the load would require such a qualification. This increases reliability since for example implausible person/vehicle combinations (or load/vehicle combinations) may be recognized and rated as a security risk (for example a government official who attempts to approach a government building in a truck or van, or a passenger car that transports bulk goods).

In the same manner, implausible person/load combinations may be determined (for example a government employee who transports liquid containers). For example, it may be taken into account whether the personal and load-related data correspond and/or appear plausible in combination.

According to a further exemplary aspect, a control unit (or a control device as well) for operating an autonomously operable motor vehicle is provided, that is configured:
  to receive location data relating to a planned location (18) of the motor vehicle; and
  to determine whether the motor vehicle is authorized to approach the planned location according to location data by using at least one of the following:
  a) personal data about at least one person using the motor vehicle;
  b) a number of persons using the motor vehicle;
  c) load data about a load that is being or is to be transported by the motor vehicle.

The control unit (also referred to as control circuit) may be single-part or multipart. For example, there may be a distributed arrangement of control devices. In general, the control unit may include at least one processor, such as a microprocessor. This may be configured to execute program instructions that for example are saved on a (digital) storage medium of the control unit. By executing the program instructions, the control unit may be configured to provide and/or execute the above-explained functionalities.

To receive the personal data or load data, the control unit may send requests in the above-describe manner and/or perform determinations of this data. For example, a person data determining unit or load data determining unit in the form of software may be provided that may be executed by the control unit.

Likewise, to receive the location data from the control unit, requests may be addressed to a navigation system of the motor vehicle, or to other corresponding data-providing units. To accomplish this, the control unit may generally comprise a location data determining unit, for example in the form of a software module that may be executed by the control unit.

In addition or alternatively and in some embodiments, the control unit may also comprise an authorization determining unit, for example in the form of software that may be executed by the control unit.

Generally speaking, the control unit may be configured to execute the method according to each of the aspects, embodiments, and versions described herein. For example, the control unit may comprise any other unit (for example any other software) or any other feature in order to execute and/or provide all of the method steps, methods measures, or method functions disclosed herein. For example, all of the developments and embodiments of the method features may also apply to the identical control unit features, or respectively be provided with them.

Further exemplary embodiments of the invention will be explained in the following with reference to the accompanying schematic FIGS.

In the exemplary embodiments, the described components of the embodiments each represent individual features that are to be considered independent of one another, in the combination as shown or described, and in combinations other than shown or described.

In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
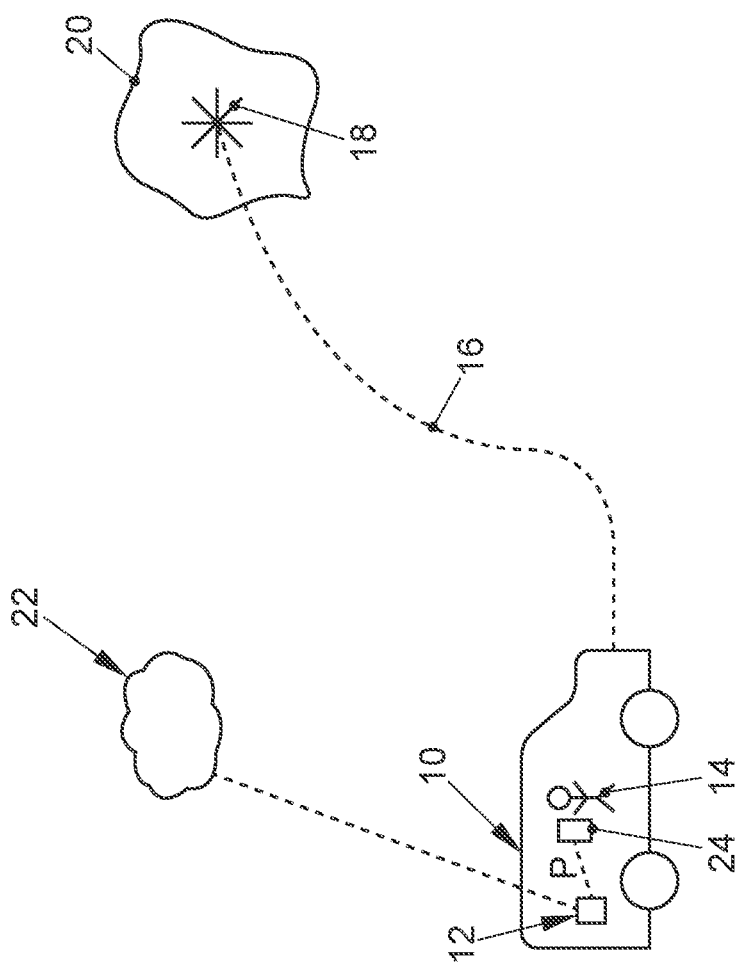
FIG. 1 shows a schematic representation to explain an exemplary method that is executed by means of a control unit according to the invention.

FIG. 1 shows a motor vehicle 10 with a control unit 12 according to an exemplary embodiment. The control unit 12 executes a method with all of the measures described below.

The motor vehicle 10 is a passenger car that is being used by at least one person 14. The vehicle 10 executes an autonomous mode of driving, or expressed otherwise, is self-driving. With respect to the mode of driving, the person 14 passively drives along in the vehicle 10.

A planned route 16 for the vehicle 10 is shown that guides the vehicle 10 to a target location (location) 18. It is generally known in the prior art to determine routes depending on a planned target location 18 which may be executed by a navigation system of the vehicle 10 that is not shown separately, and that optionally may also be comprised by the control unit 12, or may at least communicate therewith.

The location 18 is in a security zone 20. In a city center, close to a public building or generally close to expected gatherings of people, the security zone 20 may for example be defined as a virtual geographic security zone 20.

As a specific measure, the control unit 12 may determine that the location 18 is in a corresponding security zone 20. Generally speaking, the security zone 20 may also be defined as a zone in which not every member of the general public may enter, or expressed otherwise, that not all persons 14 are authorized to access.

A vehicle-external computer unit 22 is also shown. This may for example be a cloud server. The control unit 12 is configured to communicate with the external computer apparatus 22, for example by mobile communications or by means of another wireless communication link.

Location-dependent authorization data are saved in the computer unit 22. These define which persons 14 are authorized to approach which locations 18. Corresponding definitions may be variably defined, for example by a security agency. In addition, which persons 14 are authorized to approach this location 18 are also saved in the form of a database for the planned (target) location 18 to be approached shown as an example. In general, corresponding data and for example authorizations for all locations 18 within the security zone 20 may apply and be saved.

In the shown example, authorizations according to a predetermined classification are defined, and not person-specific for single individual persons 14. Stated more precisely, the persons 14 are classified according to a predetermined classification, wherein in the present case it is only an occupational classification for example.

In order to establish the class to which the person 14 is to be assigned, personal data P are received from the control unit 12 and, stated more precisely, requested and determined. To accomplish this, a communication link is established between the control unit 12 and a terminal 24 actuated by the person 14 (e.g., a wireless communication link, for example by mobile communications). The terminal 24 may be a smartphone, for example. This may directly indicate a class of the person 14 according to a predetermined classification, for example whether the person is a member of a security agency. It is however also possible to transmit identity data on the specific individual person 14, and then the control unit 12 accesses for example the server 22 in order to determine the class to which this individual person 14 is to be assigned.

Overall, the control unit 12 accordingly receives location data on the planned target location 18 from a navigation system of the vehicle 10. Based on this, it optionally determines whether it is a location 18 with restricted access. Moreover, the control unit 12 receives the personal data P with which the person 14 may be classified and/or is directly classified. In this manner, the control unit 12 may determine whether the person 14 belongs to a class or, in other words, possesses an authorization level that allows the person to approach the possibly access-restricted target location 18.

If this is the case, the control unit 12 moreover allows the autonomous driving mode of the vehicle 10 to execute the location 18. If in contrast no corresponding authorization exists, alternative route proposals may for example be output, and/or the vehicle 10 may be automatically stopped, for example at the edge of the security zone 20.

In FIG. 2, the above generally explained process of the method is again shown using a flowchart. In one measure S1, data on the planned location 18 to be approached are received.

In an optional measure S2, it is determined whether this location 18 is subject to an access restriction and lies within a security zone 20 in the shown example. That is the case here. If this were not the case, other determination steps could be omitted since the location 18 is accessible to the general public. The vehicle 10 could then directly continue its autonomous driving mode and autonomously approach the location 18.

Since however in the present example the location 18 is subject to an access restriction, measure S3 is continued, and the above described location-dependent authorization data are received there.

In measure S4 that in principle could also be executed at another time and for example parallel to one of the preceding measures S1-S3, the personal data P are then received. With measure S5, it is finally determined using this overall received data whether or not the person 14 is authorized to approach the location 18. If the authorization exists, the autonomous driving mode of the vehicle 10 is continued. If this authorization does not exist, the vehicle 10 is for example diverted or stopped.

The described examples primarily address versions a) of determining personal authorizations. In the general part, versions are also explained that relate to determining load data (also termed load-related data herein), for example in step S4 above. These may be used in addition or alternatively in order to determine if a person 14, or respectively a motor vehicle 10 is authorized to approach a location 18. They may for example be determined using vehicle-mounted cameras.

Furthermore, authorization may also be determined depending on how many people 14 are in the vehicle 10 and for example whether at least one person 14 is located therein. This may also be determined in step S4, wherein in step S2, a required or permissible number of persons 14 may then be determined if this is not specified by default (for example at least one person 14).

LIST OF REFERENCE NUMBERS

10 Motor vehicle
12 Control unit

14 Person
16 Route
18 (Target) location
20 Security zone
22 Vehicle-external computer unit (cloud server)
24 Terminal
P Personal data The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating an autonomously operable motor vehicle and for determining whether the motor vehicle is authorized to approach a planned location comprising:
   receiving location data relating to the planned location of the motor vehicle;
   receiving personal data about at least one person occupying the motor vehicle;
   determining whether the planned location is in a security zone with limited access;
   at least in case the planned location is in the security zone, determining, whether the at least one person occupying the motor vehicle is authorized to approach the planned location by accessing location-dependent authorization data, which location-dependent authorization data define one or more persons authorized to approach one or more locations; and
   in case the vehicle is controlled to approach the security zone and the at least one person is not authorized to approach the location: preventing the vehicle to stop and/or locking one or more doors of the vehicle while the vehicle is within the security zone.

2. The method of claim 1, wherein the personal data classifies the person according to a predetermined classification.

3. The method of claim 2, wherein the classification is one or more of:
   an occupational classification;
   a whereabouts-related classification; and
   a classification according to predetermined authorization classes.

4. The method of claim 1, wherein the personal data can be varied, in particular while the motor vehicle is being used by the person.

5. The method of claim 1, wherein an authorization can be granted by means of a vehicle-external unit, in particular by means of a terminal that is monitored by another person.

6. The method of claim 1, wherein when an authorization does not exist, alternatively approachable locations are determined.

7. The method of claim 1, wherein when there are many persons using the motor vehicle, the authorization is determined for each of the persons.

8. A control unit for operating an autonomously operable motor vehicle and for determining whether the motor vehicle is authorized to approach a planned location, wherein the control unit is configured:
   to receive location data relating to the planned location of the motor vehicle;
   to receive personal data about at least one person occupying the motor vehicle;
   to determine whether the planned location is in a security zone with limited access;
   to determine, at least in case the planned location is in the security zone, whether the at least one person occupying the motor vehicle is authorized to approach the planned location by accessing location-dependent authorization data, stored in a database, which location-dependent authorization data define one or more persons authorized to approach one or more locations; and
   in case the vehicle is controlled to approach the security zone and the at least one person is not authorized to approach the location: preventing the vehicle to stop and/or locking one or more doors of the vehicle while the vehicle is within the security zone.

9. The method of claim 2, wherein the personal data can be varied, in particular while the motor vehicle is being used by the person.

10. The method of claim 3, wherein the personal data can be varied, in particular while the motor vehicle is being used by the person.

11. The method of claim 2, wherein an authorization can be granted by means of a vehicle-external unit, in particular by means of a terminal that is monitored by another person.

12. The method of claim 3, wherein an authorization can be granted by means of a vehicle-external unit, in particular by means of a terminal that is monitored by another person.

13. The method of claim 4, wherein an authorization can be granted by means of a vehicle-external unit, in particular by means of a terminal that is monitored by another person.

14. The method of claim 2, wherein when an authorization does not exist, alternatively approachable locations are determined.

15. An autonomously operable motor vehicle comprising at least a control unit for determining whether the motor vehicle is authorized to approach a planned location, wherein the control unit is configured to:
   receive location data relating to the planned location of the motor vehicle;
   receive personal data about at least one person occupying the motor vehicle;
   determine whether the planned location is in a security zone with limited access;
   determine, at least in case the planned location is in the security zone, whether the at least one person occupying the motor vehicle is authorized to approach the planned location by accessing location-dependent authorization data, stored in a database, which location-dependent authorization data define one or more persons authorized to approach one or more locations; and
   in case the vehicle is controlled to approach the security zone and the at least one person is not authorized to approach the location: preventing the vehicle to stop and/or locking one or more doors of the vehicle while the vehicle is within the security zone.

* * * * *